Patented Jan. 9, 1923.

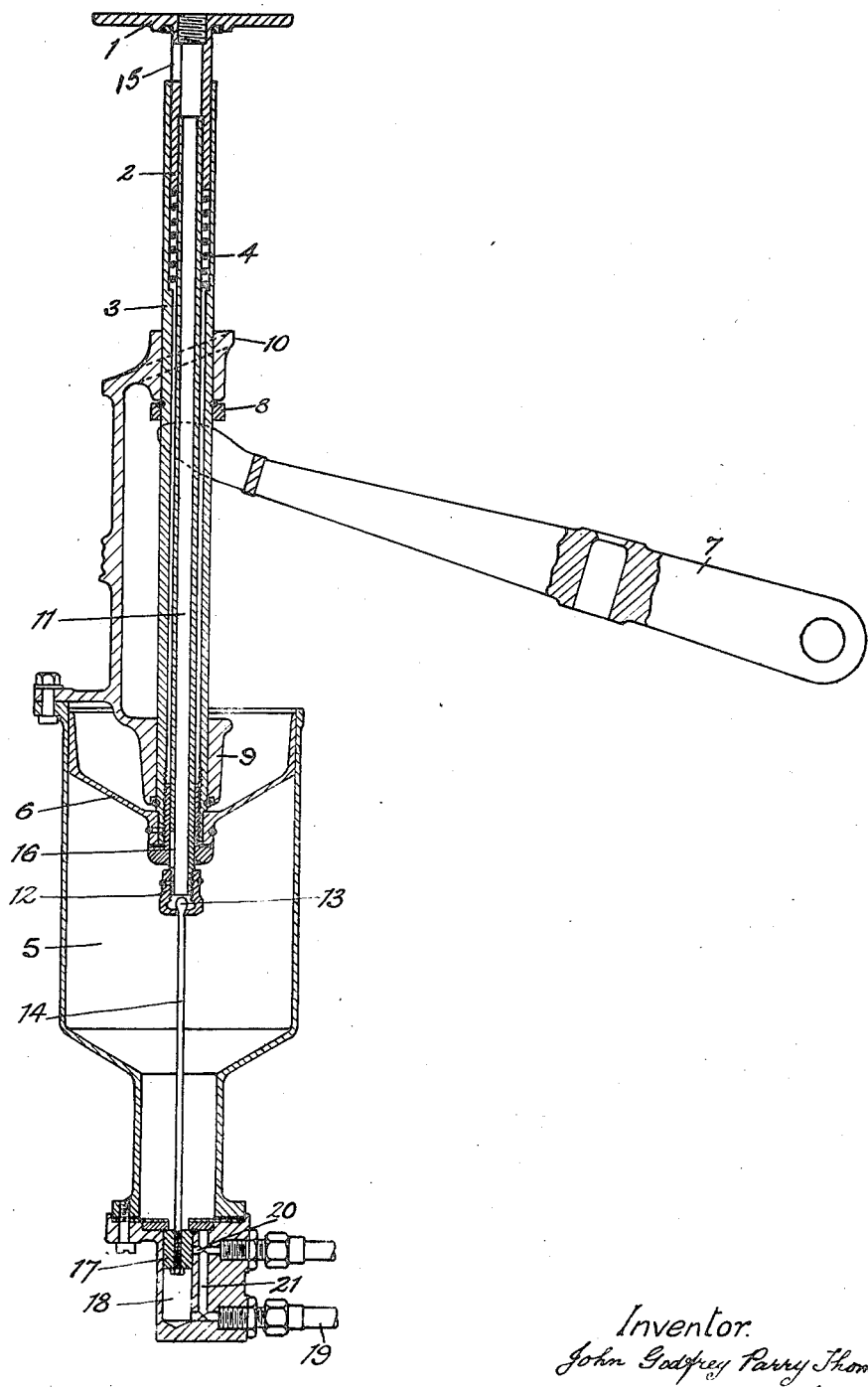

1,441,545

UNITED STATES PATENT OFFICE.

JOHN GODFREY PARRY THOMAS, OF PRESTON, ENGLAND.

CLUTCH AND BRAKE CONTROL ON ROAD VEHICLES.

Application filed October 19, 1920. Serial No. 417,859. REISSUED

*To all whom it may concern:*

Be it known that I, JOHN GODFREY PARRY THOMAS, a subject of the King of Great Britain and Ireland, residing at 5 Lathom Street, Preston, Lancashire, England, have invented new and useful Clutches and Brake Controls on Road Vehicles, of which the following is a specification.

This invention relates to the operation and control of the brakes and clutches of motor road vehicles. It consists in an apparatus which enables the brake to be applied or the clutch to be engaged by power, the extent of application or engagement being controlled by a pedal or handle of usual form; while in the event of the failure of the power the pedal or handle serves for the application of the brake or clutch by foot or hand in the usual manner.
The invention is hereinafter described in its application to a pedal controlled brake; the substitution of a handle for the pedal, or the application of the invention to a clutch instead of to a brake, will need no separate explanation, the word "pedal" being read as including handle and "brake" as including clutch.

In order that the degree of application of the brake may be controlled by the pedal the power is arranged to be applied upon depression of the pedal, and to be cut off upon the consequent movement of the brake occurring; or in other words the admission of power is dependent on relative or non-corresponding movement of the pedal and brake; that is to say, upon movement of one member which is not accompanied by corresponding movement of the other.

A convenient source of power for the purpose is the suction pipe of the internal combustion engine by which the road vehicle is propelled, for even when the engine is only turning over light a vacuum of eight to ten pounds is available in this pipe. In a preferred construction a power cylinder operated from this source is arranged with its axis in the line of movement of the pedal, which is guided upon the piston rod and can be depressed relatively to it against the action of a spring. Any such depression permits the opening of a valve under spring or fluid pressure, by which the interior of the cylinder is connected with the suction pipe; and a sufficient depression of the pedal relative to the piston rod closes a valve or port through which the interior of the cylinder is open to the atmosphere. The piston rod is interconnected with the brake lever so that its movement, whether under the pressure on the piston or the pressure on the pedal, will cause the application of the brake.

Further details of this preferred construction may be seen from the accompanying drawing which shows it diagrammatically in longitudinal section.

In this figure 1 is the pedal, the stem 2 of which slides within the end of the hollow piston rod 3 against the action of a spring 4 interposed between the stem 2 and a shoulder in the piston rod. The power cylinder is indicated at 5 and its piston at 6. The brake lever 7 has a forked end in position to be engaged by a collar 8 secured upon the piston rod which is guided in a gland 9 and bracket 10 or in other suitable fashion.

It will be apparent that the brake lever 7 will be operated upon movement of the piston rod 3, whether such movement results merely from depression of the pedal after the spring 4 is compressed, or from movement of the piston 6. As usual the brake lever is lifted or the brake pressed into "off" position by a suitable spring, not shown.

There is attached to the stem 2 of the pedal a tubular prolongation 11 which extends completely through the piston rod and piston, and at its end beyond the piston carries a screw cap 12 which attaches to it the enlarged head 13 of a rod 14. This head is small enough to pass freely into the tube 11, so that it is not of necessity pushed down when the pedal is depressed, but is positively pulled up when the cap 12 engages it. In the stem 2 there is formed a port 15, and this ported stem, co-operating with the hollow piston rod 3, constitutes a valve which is closed by a sufficient depression of the pedal 1 relatively to the piston rod. Through this port 15 and through a similar port 16 in the tube 11 and through the tube itself the interior of the cylinder 5 is normally connected with the atmosphere.

The rod 14 is attached to and operates a piston valve consisting of a piston 17 moving in a small cylinder 18. This piston may normally be pressed downward by a spring; but in the construction shown the lower end of the cylinder is permanently connected with the suction pipe of the engine through a pipe 19, so that the suction continually exerted on the piston 17 suffices to pull it down when the cap 12 permits. When sufficiently lowered the piston 17 uncovers a port 20 connected through pipe 21 with the suction pipe of the engine.

The operation of the apparatus is as follows: Initial pressure upon the pedal 1 moves it downward relatively to the piston 3, compressing the spring 4, that spring being weaker than the spring which holds the brake off. Such movement permits the piston 17 to move downwards and to uncover the port 20. The interior of cylinder 5 is then connected with the suction pipe of the engine, but as it is still also connected with the atmosphere through the port 15, air is at first idly drawn through that port and the tube 11, and the brake is not operated. But when the pedal 1 has been sufficiently depressed to bring the port 15 wholly within the piston rod 3, and thereby close it, the suction exerted on the piston 6 pulls it down and through the collar 8 and lever 7 applies the brake. If the pedal 1 is not further depressed the movement of the piston rod 3 will uncover the port 15, whereupon such movement will stop. If the pedal 1 is further depressed the brake lever 7 must move further before the port 15 can again be uncovered. Thus the extent of depression of the pedal governs the extent of application of the brake.

Nevertheless, if for any reason, as through the engine stopping, power should fail, the depression of the pedal will obviously, after the spring 4 is compressed, itself cause movement of the piston rod and therefore of the brake lever 7 under the pressure of the foot.

What I claim is:—

1. In a motor road vehicle having an internal combustion engine the combination with a control lever, of a cylinder and piston adapted to operate said lever, a control device operable by the driver, a connection between said cylinder and the suction pipe of the engine, and a valve connecting said cylinder with the atmosphere depending on the positions of both said lever and said control device.

2. In a motor road vehicle having an internal combustion engine, the combination of a control lever with a cylinder and piston adapted to operate said lever, a control device operable by the driver, a valve connecting said cylinder with the suction pipe of the engine, a connection between said valve and said control device normally holding said valve closed but permitting it to open upon actuation of said control device, and means causing said valve to open when so permitted.

3. In a motor road vehicle the combination of a control lever with a cylinder, piston and piston rod adapted to operate said lever, a control pedal operable by the driver mounted on and slidable along said piston rod to a limited extent, a spring resisting movement of said pedal along said rod, and means admitting power to said cylinder adapted to be actuated by said pedal.

4. In a motor road vehicle, the combination of a control lever, a control device actuated by the driver, a yielding connection between said device and said lever permitting limited movement of said device without movement of said lever, and a power apparatus for actuating said lever governed by motion of said control device which strains said yielding connection.

5. In a motor road vehicle having an internal combustion engine, the combination with a control lever, of a power cylinder operating said lever, a valve connecting said cylinder with the suction pipe of the engine, and a control device actuated by the driver for governing said valve.

6. In a motor road vehicle having an internal combustion engine, a power unit for actuating control apparatus, comprising a cylinder and piston, a valve connecting said cylinder with the suction pipe of the internal combustion engine, a second valve connecting said cylinder with the atmosphere, and a control device operable by the driver for opening the first valve and closing the second.

7. In a motor road vehicle having an internal combustion engine, the combination with a control lever, of a cylinder and piston adapted to operate said lever, a control device operable by the driver, a yielding connection between said device and said lever, permitting the lever to be operated by said device after limited independent movement of the device, a valve connecting said cylinder with the suction pipe of the engine, and a second valve closed by movement of the control device not accompanied by movement of the lever connecting said cylinder with the atmosphere.

8. In a motor road vehicle having an internal combustion engine, the combination of a control lever with a cylinder, piston and hollow piston rod adapted to operate said lever, a control pedal operable by the driver mounted on and slidable along said piston rod and forming therewith a valve connecting said cylinder with the atmosphere, and means connecting said cylinder with the suction pipe of the engine.

9. In a motor road vehicle the combination with a control lever, of a control device for actuation by the driver, a yielding connection between said device and said lever permitting the lever to be operated by said device after limited independent movement of the device, a power apparatus for actuating said lever, and means admitting power to said apparatus depending on the position of both said lever and said control device.

In witness whereof I have hereunto signed my name this 4th day of October, 1920.

J. G. P. THOMAS.